United States Patent [19]

Aldridge

[11] 4,080,127
[45] Mar. 21, 1978

[54] STRAND FORMING AND GRANULATING MACHINE

[75] Inventor: Milton M. Aldridge, Decatur, Ala.

[73] Assignee: Monsanto Company, St. Louis Missouri, Decatur, Ala.

[21] Appl. No.: 752,059

[22] Filed: Dec. 20, 1976

[51] Int. Cl.² .................................................. B29F 3/00
[52] U.S. Cl. ........................................ 425/71; 425/215;
425/382.2; 425/464; 425/404; 425/445
[58] Field of Search .................. 425/66, 71, 215, 308,
425/315, 316, 382, 382.2, 377, 463, 464, 404,
445, 378 S, 72 S, 379 S

[56] References Cited
U.S. PATENT DOCUMENTS

| 3,600,745 | 8/1971 | Hench et al. | 425/66 |
| 3,650,645 | 3/1972 | Yamada et al. | 425/71 |

Primary Examiner—Francis S. Husar
Assistant Examiner—Mark Rosenbaum
Attorney, Agent, or Firm—Robert L. Broad, Jr.

[57] ABSTRACT

In a strand forming machine wherein a polymeric strand in molten form is fed downward into and through an upright tube positioned below the surface of a liquid quenching medium in a container having a bottom and side walls, the improvement comprising a hollow element mounted in the container and surrounding the tube, the hollow element extending above the side wall of the container and having a channel extending outwardly over the wall of the container in such a manner that in the event the strand fails to pass through the tube the excess molten strand will accumulate in and flow outward through the channel to a location outside the container.

5 Claims, 4 Drawing Figures

STRAND FORMING AND GRANULATING MACHINE

BACKGROUND OF THE INVENTION a. Field of the Invention

This invention relates to improvements in apparatus for forming and granulating polymeric strands.

b. Description of the Prior Art

U.S. Pat. No. 3,600,745 discloses an apparatus for the processing of synthetic plastics from a melt to solid granules of uniform size. The melt is extruded in the form of strands which are then quenched and, after being quenched, are cut into granules. A polymeric strand in molten form is fed downward into and through an upright tube or injector positioned below the surface of the liquid quenching medium in a container or headwater chamber. The strand is fed downward through the injector and is solidified by the quenching medium prior to being cut into granules at a point below the headwater chamber. This apparatus works well but has a major disadvantage in that it requires the continuous presence of an operator who must constantly observe the machine to be sure that the strands pass down through the tubes to the cutters If for some reason the strand stops in the tube, the molten polymer will overflow the upper end of the tube into the chamber and will, within minutes, fill the chamber to the extent that flow of the other strands will be disrupted. With all of the polymeric strands flowing into the chamber, the chamber will soon be filled with the solidified polymeric material. The machine must then be shut down and the polymeric material removed from the chamber. This is a difficult job and frequently requires the use of hammers and chisels to remove the solidified polymeric materials.

SUMMARY OF THE INVENTION

In a strand forming machine wherein a polymeric strand in molten form is fed downward into and through an upright tube positioned below the surface of a liquid quenching medium in a container, the improvement comprising a hollow element mounted in the container and surrounding the tube, the hollow element extending above the side wall of the container and having a channel extending outwardly over the wall of the contaner in such a manner that in the event the strand fails to pass through the tube the excess molten strand will accumulate in and flow outward through the channel to a location outside the contaner.

DETAILED DESCRIPTION OF THE INVENTION

Figure 1:
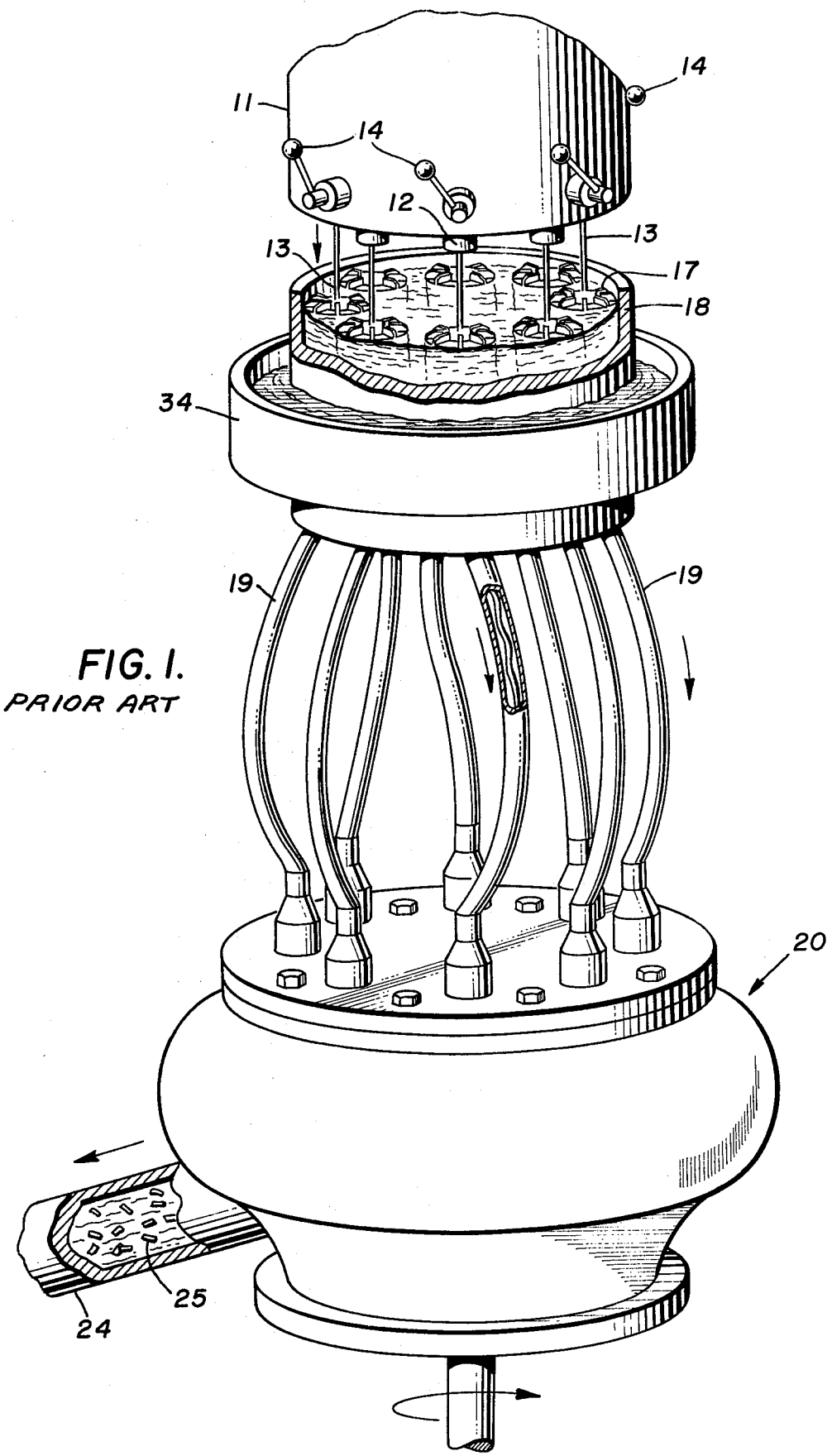
FIG. 1 is a perspective view of one type of polymeric strand forming and cutting machine in which the present invention is especially useful.

Referring now in detail to the drawing, there is shown in FIG. 1 a conventional machine for extruding a molten polymeric material into strands, quenching the strands in a liquid medium and then cutting the solidified strands into granules. This machine is disclosed in detail in U.S. Pat. No. 3,600,745.

The machine diclosed in U.S. Pat. No. 3,600,745 and shown in FIG. 1 includes a spinning head 11 having therein a plurality of spinning nozzles 12 which form strands 13 of a polymeric material such as polyester. Handles 14, each associated with one of the nozzles 12, are provided for operating valves (not shown) to shut off polymer flow to the nozzles. The strands 13, in molten form, enter vertical injectors or tubes 17 mounted in a container 18 containing a liquid quenching medium such as water. Each of the injectors 17 is connected to a tube 19 leading downward to a cutting apparatus 20. The water level in the containr 18 is maintained at such a height that water overflows into the upper end of each of the injectors 17 and flows downward through the tubes 19 to the cutter to quench or solidify the strands 13 prior to their reaching the cutting apparatus 20. The cutter 20 is provided with a discharge line 24 through which water and cut polymer granules 25 are withdrawn from the cutter.

Figure 2:
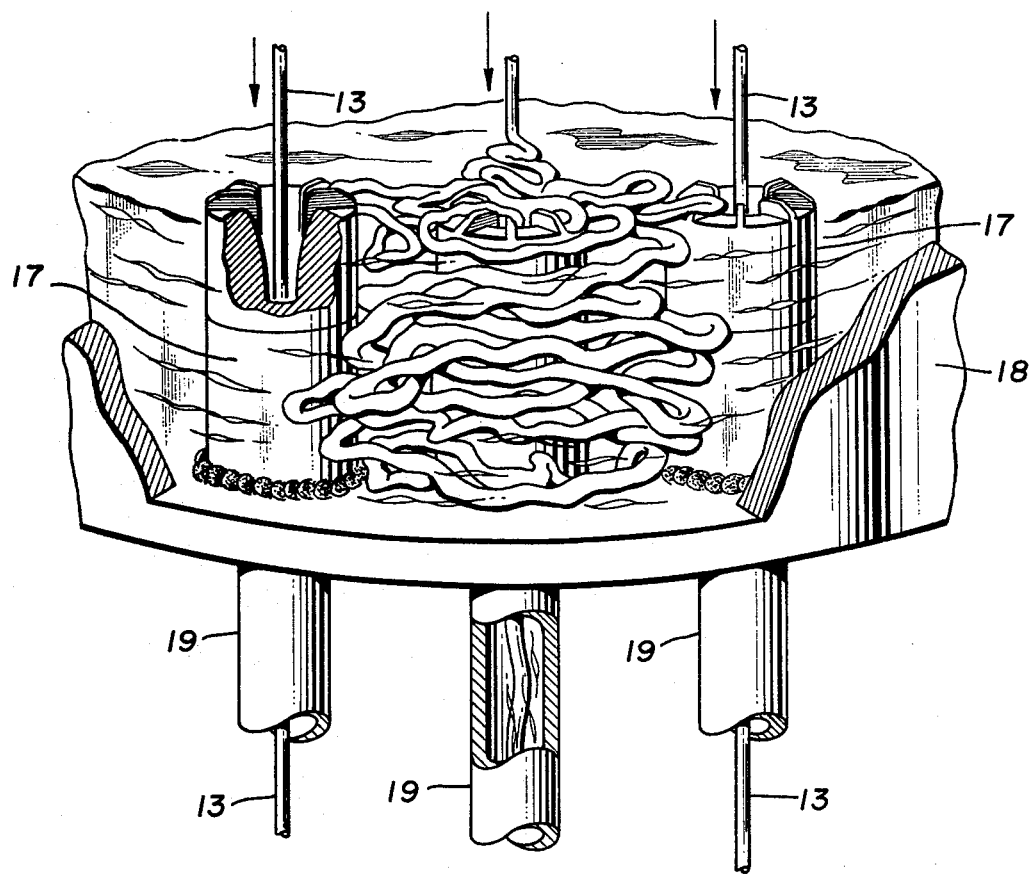
FIG. 2 is an enlarged fragmentary view showing the upper ends of tubes through which the polymeric strands pass to the cutter in the machine of FIG. 1 and the manner in which the container fills in the event that a strand fails to continue to feed the cutter.

If for some reason, one of the strands 13 should fail to move downward through its tube 19, the molten polymer will overflow from the injector 17 into the container 18 and within a matter of a few minutes will have overflowed to the extent that flow of the other strands 13 is disrupted. The result is shown in FIG. 2. The machine must then be shut down and the hardened polymeric material removed from the container 18. This disadvantage is overcome by the present invention.

Figure 3:
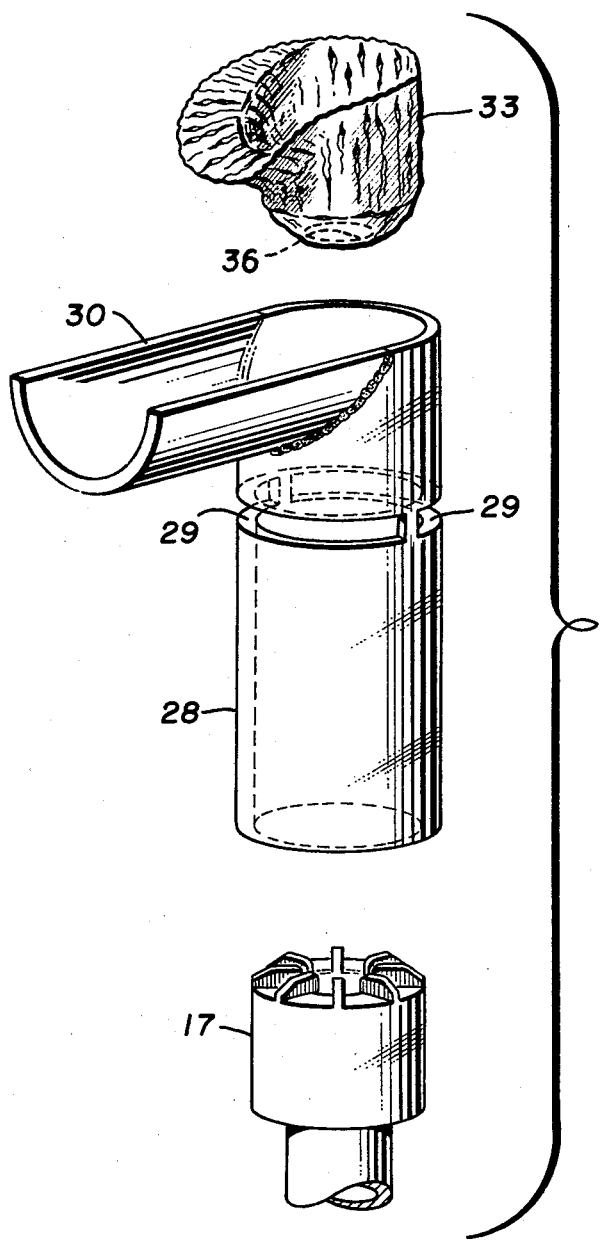
FIG. 3 is an enlarged and exploded perspective view showing the elements of the present invention.

FIG. 3 shows the apparatus of the present invention, with one of the injectors 17. This includes a tube 28 adapted to be mounted on the bottom of the container 18 in a position concentric to be injector 17. The tube 28 is of a sufficient length to extend above the upper edge of the side wall of the container 18 and is provided with a pair of slots 29 which are level with the top of the injector 17 to allow water to flow from the container 18 through the slots 29 and into the upper end of the injector 17.

The tube 28 is provided with a channel 30 which extends outward above the wall of the container 18, the purpose of the channel 30 being to direct any excess molten polymer outward and over the edge of the wall of the container 18 to a location outside the container 18. A disposable cup 33, made of a material such as aluminum foil shaped to fit the upper end of the element 28, is provided for preventing the molten polymer from adhering to the element 28 in the event that the strand 13 stops for some reason. The cup 33 is provided with a hole 36 through which the strand 13 normally passes. The most frequent cause of failure of the strand to continue moving is jamming of the strand at the entrance to the cutter. Since the strand is quenched to solidification in the upper few inches of the injector 17 the molten polymeric material will overflow the upper end of the injector 17, rather than filling the tube 19, when the strand stops.

Figure 4:
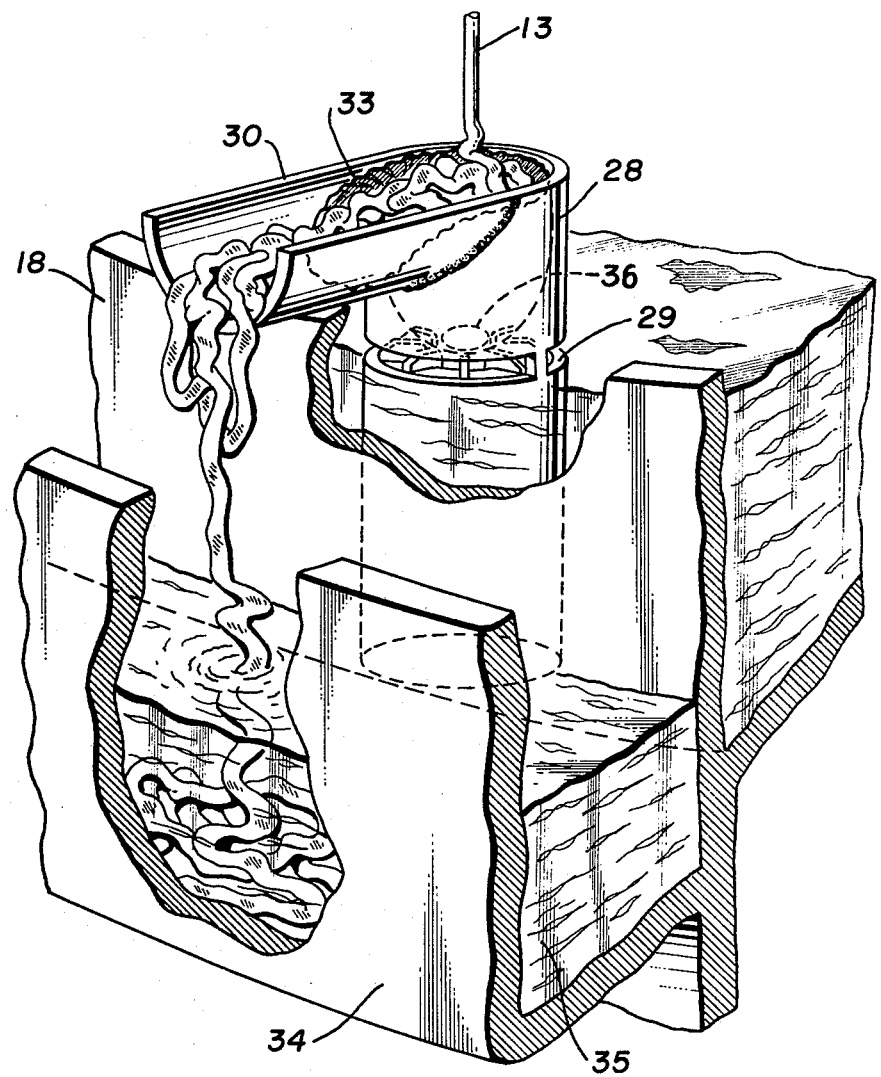
FIG. 4 is an enlarged fragmentary view showing the manner in which the apparatus acts to direct the molten polymeric strand out of the container when a strand fails to move downward to the cutter.

FIGS. 1 and 4 show a trough or vat 34 which is added to the machine described above to contain a quenching liquid 35 such as water, the trough 34 extending around the periphery of the container 18 in a position to collect any molten polymeric material which overflows from the end of the channel 30. This prevents molten polymer from running down the side of the machine. This also reduces the possibility of burns being incurred by the operator.

In operation, the polymeric strands 13 leave the extrusion head 11 in a molten form and travel downward through the injectors 17 and the tubes 19 to the cutting mechanism 20, the strands 13 being quenched or solidified prior to reaching the cutter. If for some reason, the strand 13 fails to feed through th tube 19, the excess molten polymeric material is deposited in the disposable cup 33 and moves outward through the chamnel 30 to drop into the trough 34 to be quenched. The operator moves the appropriate valve handle 14 to shut off flow of molten polymer from the extrusion nozzle 12 and then lifts out the cup 33 with the excess polymeric material and disposes of it. The operator next pulls the solidified strand 13 out of the tube 19 and then places a new cup 33 in position as shown and again moves the handle 14 to allow polymer flow from that nozzle 12. It will readily be seen that with this invention, the failure of one strand 13 to feed down through the tube 19 will not disrupt the flow of all of the strands 13. The apparatus may be observed from a remote location by the use of television cameras, whereas without the invention an operator must constantly remain at and observe the machine.

I claim:

1. In a strand forming machine wherein a polymeric strand in molten form is fed downward into and through an upright tube positioned below the surface of a liquid quenching medium in a container having a bottom and side walls, the improvement comprising a hollow element mounted in the container and surrounding the tube, said hollow element extending above the side wall of the container and having a channel extending outwardly over the wall of the container in such a manner that in the event the strand fails to pass through the tube the excess molten strand will accumulate in and flow outward through the channel to a location outside the container.

2. The apparatus of claim 1 wherein a disposable cup is positioned in the hollow element to prevent the molten polymer from adhering to said element.

3. The apparatus of claim 1 wherein a vat extends around the container on the outside thereof, said vat being adapted to contain a quenching liquid and being so positioned that molten polymer flowing through the channel will flow into the vat and be quenched.

4. The apparatus of claim 1 wherein the hollow element extends above the surface of the quenching medium and is provided with an opening positioned to allow the quenching medium to flow from the container into the hollow element and into the tube.

5. The apparatus of claim 4 wherein the hollow element is tubular in configuration.

* * * * *